(12) United States Patent
Kono

(10) Patent No.: US 7,577,153 B2
(45) Date of Patent: Aug. 18, 2009

(54) DATA TRANSFER APPARATUS AND DATA TRANSFER METHOD

(75) Inventor: Shigeo Kono, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 637 days.

(21) Appl. No.: 10/988,544

(22) Filed: Nov. 16, 2004

(65) Prior Publication Data

US 2005/0105530 A1 May 19, 2005

(30) Foreign Application Priority Data

Nov. 17, 2003 (JP) .............................. 2003-387203

(51) Int. Cl.
H04L 12/28 (2006.01)

(52) U.S. Cl. .................................. 370/395.65; 709/230

(58) Field of Classification Search .................. 370/310, 370/469, 328, 401, 380, 390, 278, 312; 340/431; 709/236, 245, 230, 223; 455/432.1
See application file for complete search history.

(56) References Cited

U.S. PATENT DOCUMENTS

| | | | | |
|---|---|---|---|---|
| 5,682,460 A | | 10/1997 | Hyziak et al. ............... | 395/600 |
| 5,778,189 A | * | 7/1998 | Kimura et al. ............... | 709/236 |
| 6,064,299 A | * | 5/2000 | Lesesky et al. .............. | 340/431 |
| 6,144,641 A | | 11/2000 | Kaplan et al. ............... | 370/238 |
| 6,539,030 B1 | | 3/2003 | Bender et al. ............... | 370/469 |
| 6,594,700 B1 | * | 7/2003 | Graham et al. .............. | 709/230 |
| 2002/0022453 A1 | | 2/2002 | Balog et al. ................. | 455/41 |
| 2003/0123464 A1 | * | 7/2003 | Lee et al. .................... | 370/401 |
| 2003/0149790 A1 | * | 8/2003 | Hwang ....................... | 709/245 |
| 2003/0225900 A1 | * | 12/2003 | Morishige et al. ........... | 709/230 |
| 2003/0229690 A1 | * | 12/2003 | Kitani et al. ................ | 709/223 |
| 2004/0008680 A1 | * | 1/2004 | Moss et al. .................. | 370/390 |
| 2004/0139210 A1 | * | 7/2004 | Lee et al. .................... | 709/230 |
| 2004/0151171 A1 | * | 8/2004 | Lee et al. .................... | 370/380 |

(Continued)

FOREIGN PATENT DOCUMENTS

EP    0695075 A1    1/1996

(Continued)

OTHER PUBLICATIONS

Protocol Conversion; Green, P., Jr.; Communications, IEEE Transactions on vol. 34, Issue 3, Mar. 1986 pp. 257-268.*

(Continued)

Primary Examiner—Edan Orgad
Assistant Examiner—Salman Ahmed
(74) Attorney, Agent, or Firm—Pillsbury Winthrop Shaw Pittman, LLP

(57) ABSTRACT

A data transfer apparatus according to this invention executes a protocol priority determination process of selecting usable transfer protocols in accordance with the type of transfer object and determining the priorities of the transfer protocols in accordance with the process of an automatic file transfer protocol selection process routine. The data transfer apparatus then executes a protocol selection process of selecting transfer protocols commonly usable in the transfer source apparatus and transfer destination apparatus of the transfer object. The data transfer apparatus executes a transfer protocol determination process of determining a transfer protocol for use on the basis of the transfer protocol and its priority which are determined in the protocol priority determination process, and the transfer protocols selected in the protocol selection process.

12 Claims, 6 Drawing Sheets

U.S. PATENT DOCUMENTS

| | | | |
|---|---|---|---|
| 2004/0156331 A1* | 8/2004 | Wang | 370/328 |
| 2004/0156373 A1* | 8/2004 | Ha et al. | 370/401 |
| 2004/0229608 A1* | 11/2004 | Isukapalli et al. | 455/432.1 |
| 2005/0007967 A1* | 1/2005 | Keskar et al. | 370/310 |
| 2005/0007969 A1* | 1/2005 | Hundscheidt et al. | 370/312 |
| 2005/0078616 A1* | 4/2005 | Nevo et al. | 370/278 |

FOREIGN PATENT DOCUMENTS

| | | | |
|---|---|---|---|
| EP | 0901261 A2 | * | 3/1999 |
| GB | 2254981 | * | 10/1992 |
| JP | 11-113061 | | 4/1999 |
| JP | 2000-35930 | | 2/2000 |
| WO | WO0054476 | * | 9/2000 |
| WO | WO 02/19653 A2 | | 3/2002 |
| WO | WO 02/078276 | | 10/2002 |

OTHER PUBLICATIONS

Adaptors for protocol conversion; Calvert, K.L.; Lam, S.S.; INFOCOM '90. Ninth Annual Joint Conference of the IEEE Computer and Communication Societies. 'The Multiple Facets of Integration'. Proceedings., IEEE.*

An efficient method for protocol conversion; Tao, Z.P.; v. Bochmann, G.; Dssouli, R.; Computer Communications and Networks, 1995. Proceedings., Fourth International Conference on Sep. 20-23, 1995 pp. 40-47.*

A comparison of protocol conversion methods for the retrofit of SCADA systems; Hoge, D.J.; Jensen, J.R.; Petroleum and Chemical Industry Conference, 1988, Record of the Conference Papers., Industrial Applications Society 35th Annual.*

European Search Report dated Mar. 15, 2005 for Appln. No. EP 04 02 6299.

Japanese Office Action dated Apr. 21, 2009.

* cited by examiner

| Object attribute | Protocol priority No1 | Protocol priority No2 | : | Protocol priority No m-1 | Protocol priority No m |
|---|---|---|---|---|---|
| Object1 | Protocol1 | Protocol m | : | Protocol4 | Protocol2 |
| Object2 | Protocol2 | Protocol m-1 | : | | |
| : | : | : | : | : | : |
| Object n-1 | Protocol5 | Protocol7 | : | Protocol3 | |
| Object n | Protocol3 | Protocol5 | : | | |

| Protocol1 | Protocol2 | -------- | -------- | Protocol j |
|---|---|---|---|---|

| Object attribute | Protocol priority No1 | Protocol priority No2 | Protocol priority No3 |
|---|---|---|---|
| Folder | FTP | | |
| Image file | BIP | OPP | FTP |
| PIM file | OPP | FTP | |
| General file | FTP | OPP | |

DATA TRANSFER APPARATUS AND DATA TRANSFER METHOD

CROSS-REFERENCE TO RELATED APPLICATIONS

This application is based upon and claims the benefit of priority from prior Japanese Patent Application No. 2003-387203, filed Nov. 17, 2003, the entire contents of which are incorporated herein by reference.

BACKGROUND OF THE INVENTION

1. Field of the Invention

The present invention relates to a data transfer apparatus and data transfer method which are suitably applied to an electronic device capable of transferring data by wireless communication.

2. Description of the Related Art

There have recently been developed new wireless communication systems for wirelessly connecting electronic devices, as disclosed in, e.g., Jpn. Pat. Appln. KOKAI Publication No. 11-113061. A known example of the wireless communication system of this type is Bluetooth™ which is a short-distance wireless communication standard targeting connection between various electronic devices including a computer.

In Bluetooth™, a transfer protocol used for file transfer between apparatuses is determined by the type of transfer object and a transfer protocol supported in both the transfer source apparatus and transfer destination apparatus. In general, the operator is explicitly involved in selection of the transfer protocol, and the operability is not always good.

BRIEF SUMMARY OF THE INVENTION

According to the present invention, there is provided a data transfer apparatus which transfers data of various objects from a transfer source device to a transfer destination device via a communication device, comprising means for determining transfer protocols depending on an object to be transferred and priorities of the transfer protocols, means for determining transfer protocols usable in both the transfer source device and the transfer destination device of the transfer object, and means for determining a transfer protocol used for transfer on the basis of determination results.

According to the present invention, there is provided a method of transferring a transfer object from a transfer source device to a transfer destination device by using a communication device, comprising determining transfer protocols depending on the object to be transferred and priorities of the transfer protocols, determining transfer protocols usable in both the transfer source device and the transfer destination device, and determining a transfer protocol used for transfer on the basis of determination results.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a table showing an example of the structure of a protocol priority determination table according to the embodiment of the present invention;

FIG. 7 is a table showing an example of the structure of a usable protocol lookup table according to the embodiment of the present invention;

DETAILED DESCRIPTION OF THE INVENTION

A preferred embodiment of the present invention will be described below with reference to the several views of the accompanying drawing. The embodiment exemplifies an application of the present invention to Bluetooth™ wireless communication. However, this is merely an application example, and the present invention is not limited to this.

Figure 1:
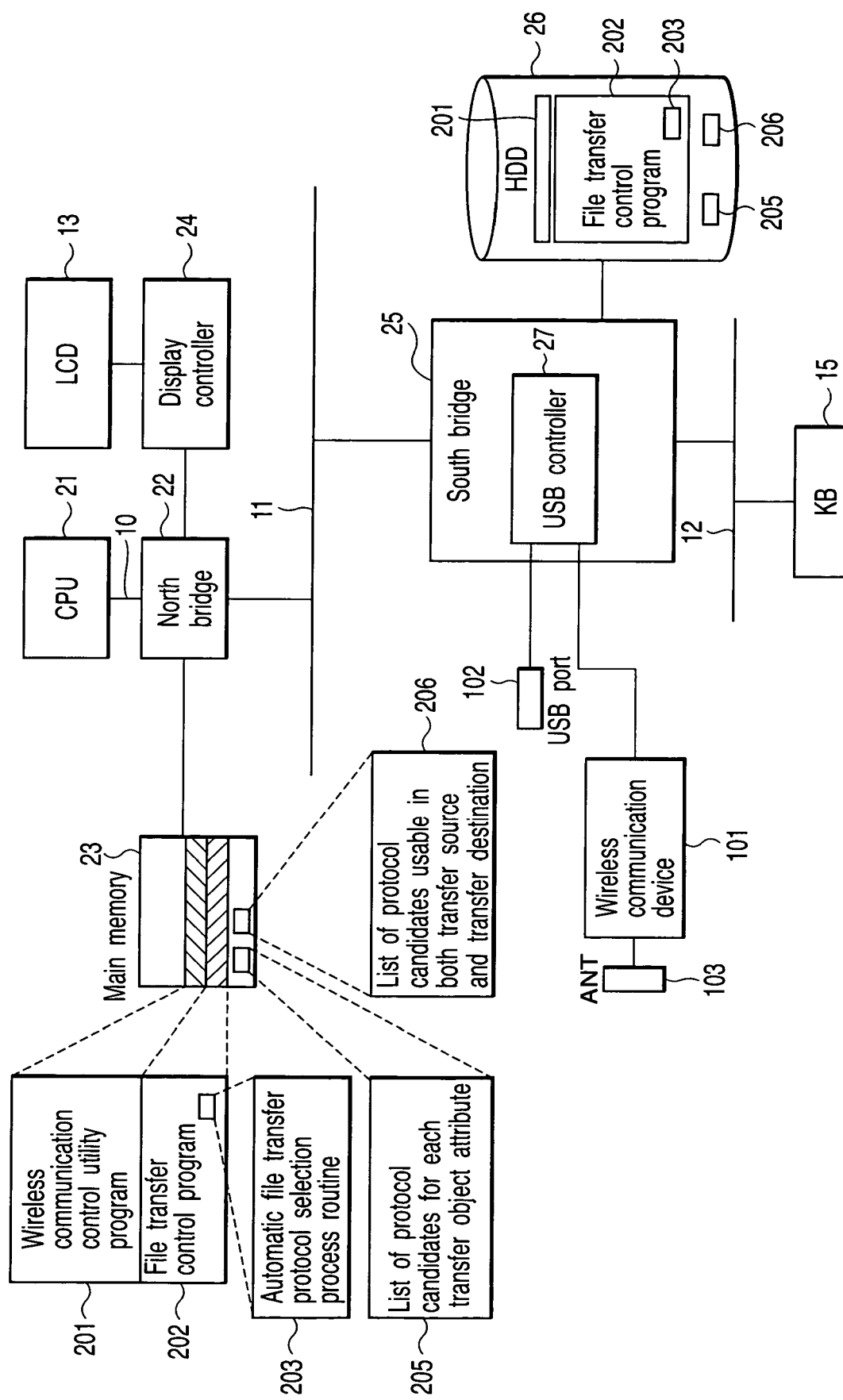
FIG. 1 is a block diagram showing an example of the arrangement of a data transfer apparatus according to an embodiment of the present invention.

FIG. 1 shows the arrangement of a data transfer apparatus according to the embodiment of the present invention. The data transfer apparatus is implemented by an information processing device such as a PDA (Personal Digital Assistant) or notebook type portable personal computer having a wireless communication function. The data transfer apparatus comprises a CPU 21, north bridge 22, main memory 23, display controller 24, south bridge 25, hard disk drive (HDD) 26, and wireless communication device 101. The main body of the information processing device is equipped with a keyboard 15, pointing device (not shown), and the like. A display unit having an LCD (Liquid Crystal Display) 13 which forms a display is attached to the main body pivotally between an open position and a closed position.

The CPU 21 is a processor adopted to control the operation of the information processing device. The CPU 21 executes an operating system (OS) and various application programs which are loaded from the HDD 26 to the main memory 23. In the embodiment, a file transfer control program 202 is loaded from the HDD 26 to the main memory 23 in addition to a wireless communication control utility program 201, and is executed by the CPU 21.

The file transfer control program 202 has an automatic file transfer protocol selection process routine 203. The automatic file transfer protocol selection process routine 203 realizes a function of creating a list (to be referred to as a "protocol priority determination table" hereinafter) 205 of protocol candidates for each transfer object attribute, and a list (to be referred to as a "usable protocol lookup table" hereinafter) 206 of protocol candidates usable in both the transfer source and transfer destination, and a function of automatically selecting a transfer protocol depending on the transfer object by using these tables. The structures of these tables and the like will be described later.

The HDD 26 stores the wireless communication control utility program 201, file transfer control program 202, and the like as information associated with processes of the embodiment. The wireless communication control utility program 201 and file transfer control program 202 which are stored in the HDD 26 are loaded to the main memory 23 and executed by the CPU 21. At this time, the wireless communication control utility program 201 transfers data (in this case, files) of various objects by using a transfer protocol set by the automatic file transfer protocol selection process routine 203 of the file transfer control program 202. Details of a file transfer process complying with selection of the transfer protocol will be described later.

Figure 11:
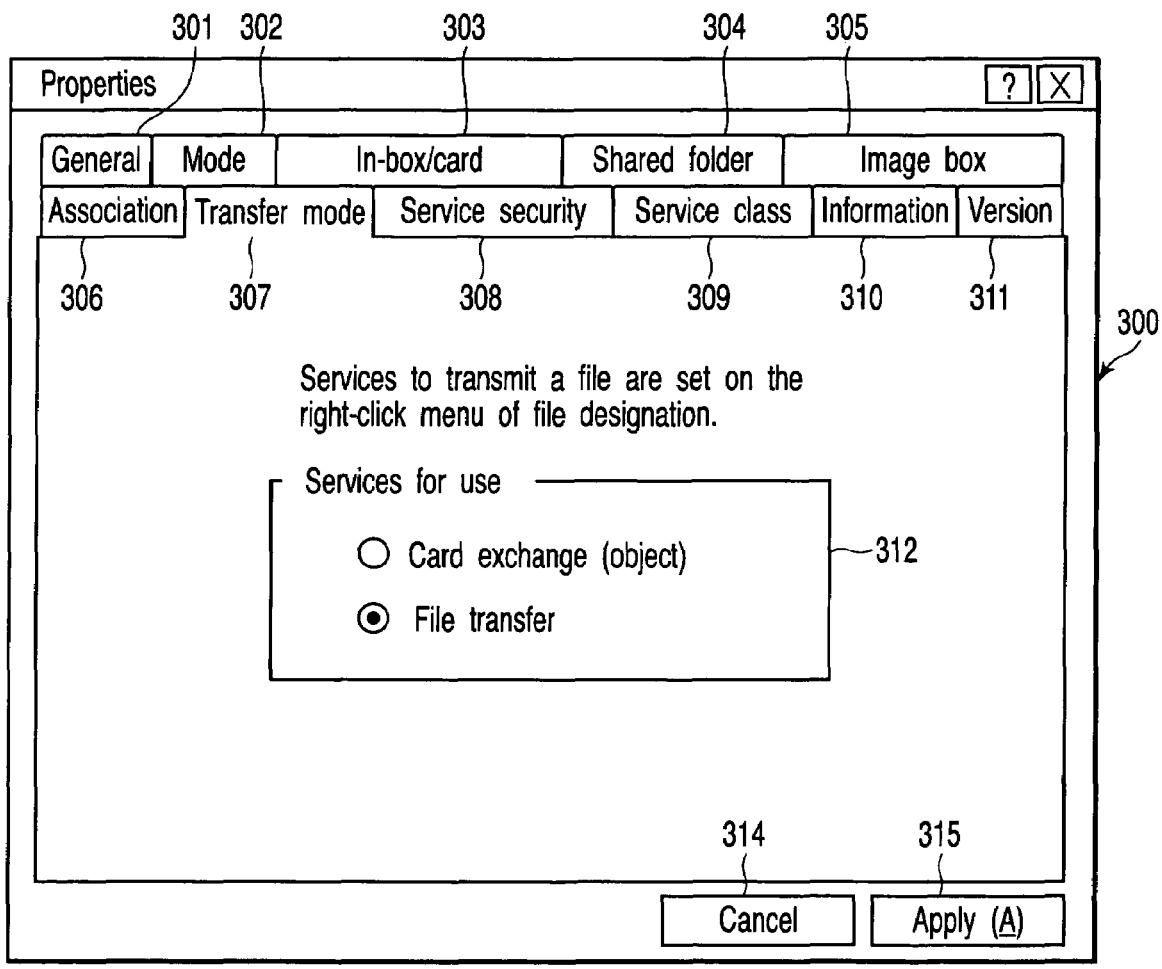
FIG. 11 is a schematic view showing an example of a property setting window for explaining a concrete example of the automatic protocol selection process according to the embodiment of the present invention.

The display controller 24 controls the LCD 13 used as the display monitor of the information processing device. In the embodiment, the LCD 13 displays various property setting windows associated with selection of a transfer protocol depending on the transfer object as shown in FIG. 11.

The north bridge 22 is a bridge device which connects a local bus 10 and PCI bus 11 of the CPU 21 in two ways. The south bridge 25 is a bridge device which connects the PCI bus 11 and an ISA bus 12 in two ways. The ISA bus 12 is connected to the keyboard 15 and the like. The south bridge 25 incorporates a USB (Universal Serial Bus) controller 27. The USB controller 27 is connected to the wireless communication device 101 and a USB port 102.

By wireless communication, the wireless communication device 101 performs finding, connection, and file transfer of a peripheral device serving as a connection partner under the control of the wireless communication control utility program 201. The wireless communication device 101 executes transmission/reception of radio signals via an antenna (ANT) 103 in accordance with a command input from the CPU 21 via the USB controller 27. The wireless communication device 101 includes an RF unit and baseband unit (neither is shown). The RF unit performs up-conversion from an intermediate frequency to an RF frequency, and down-conversion from an RF frequency to an intermediate frequency. The baseband unit modulates transmission data and demodulates reception data in accordance with a predetermined wireless communication protocol.

Figure 2:
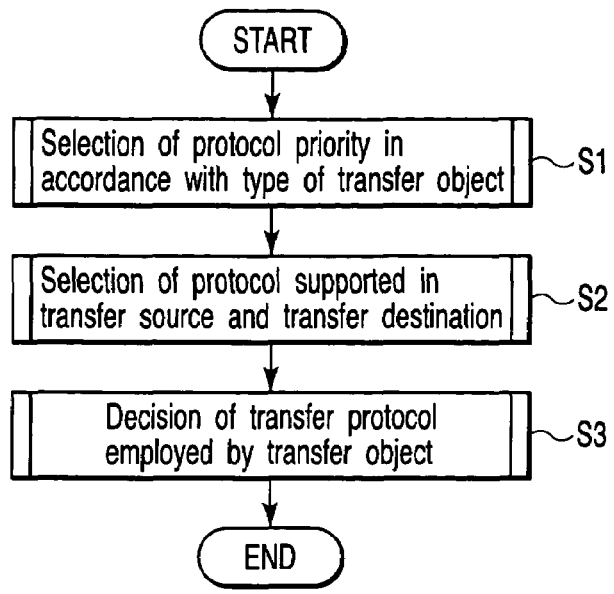
FIG. 2 is a flowchart showing an example of an automatic protocol selection process sequence according to the embodiment of the present invention.
Figure 3:
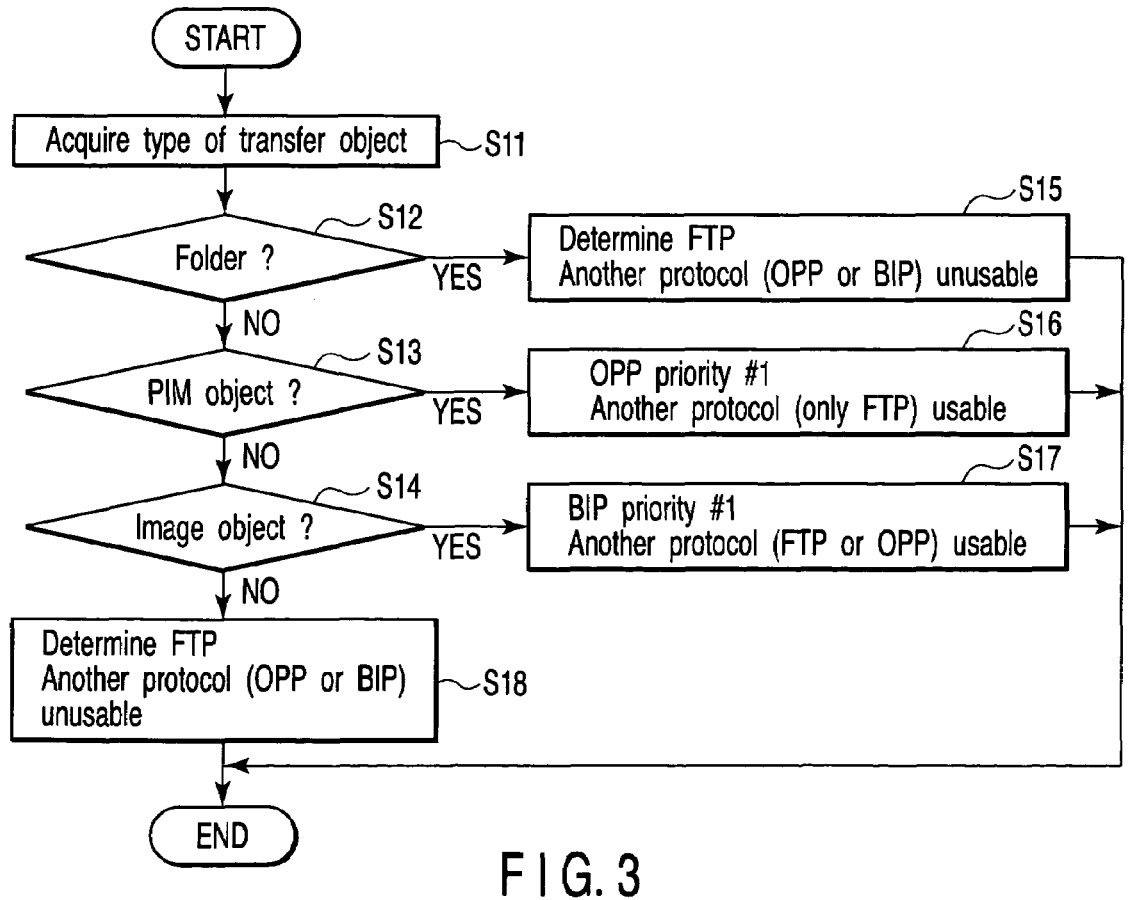
FIG. 3 is a flowchart showing an example of a detailed process sequence in step S1 of FIG. 2.
Figure 4:
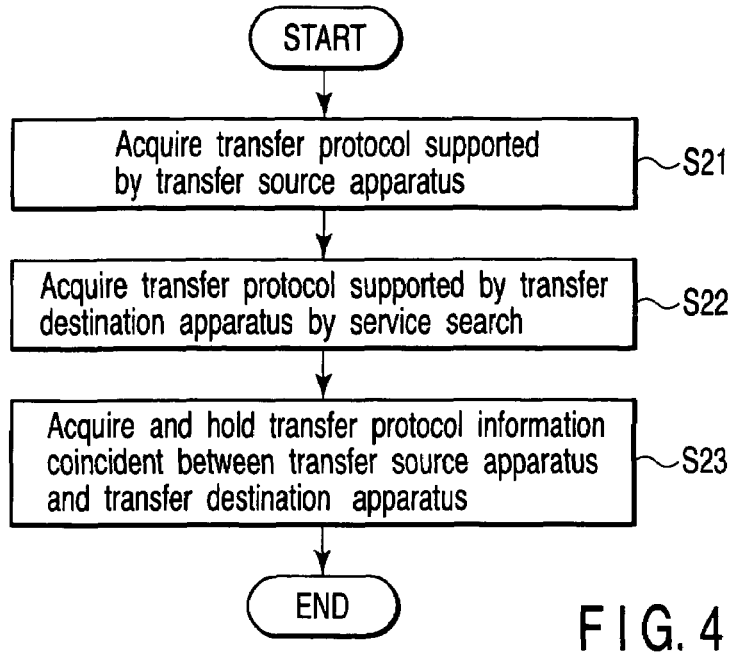
FIG. 4 is a flowchart showing an example of a detailed process sequence in step S2 of FIG. 2.
Figure 5:
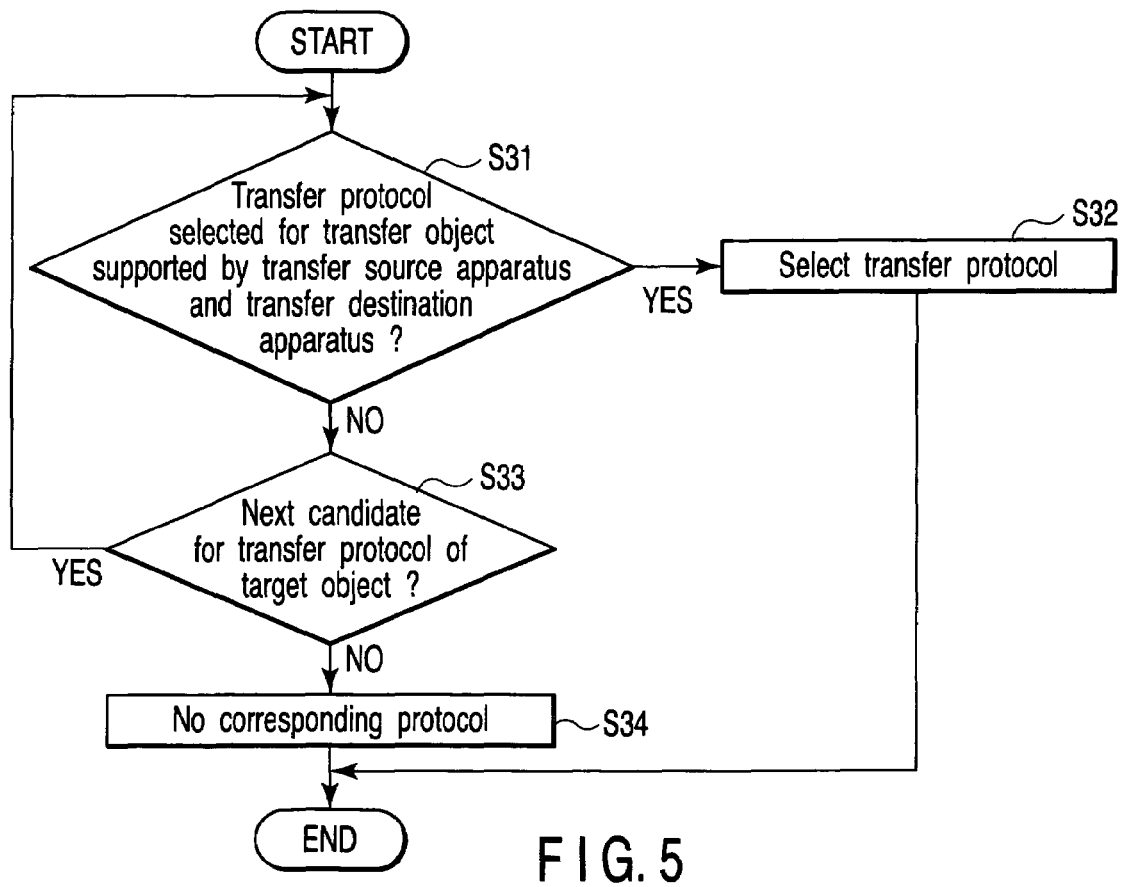
FIG. 5 is a flowchart showing an example of a detailed process sequence in step S3 of FIG. 2.

FIGS. 2 to 5 show process sequences of the data transfer apparatus according to the embodiment of the present invention. Processes shown in FIGS. 2 to 5 are implemented when the CPU 21 executes the process of the automatic file transfer protocol selection process routine 203 of the file transfer control program 202 stored in the main memory 23. FIG. 2 is a flowchart showing the overall sequence of the automatic selection process of a transfer protocol depending on the transfer object. FIG. 3 is a flowchart showing the sequence of a process (protocol priority determination process) in step S1 of FIG. 2. FIG. 4 is a flowchart showing the sequence of a process (protocol matching determination process) in step S2 of FIG. 2. FIG. 5 is a flowchart showing the sequence of a process (use protocol selection process) in step S3 of FIG. 2.

In the process of the automatic file transfer protocol selection process routine 203, usable transfer protocols are selected in accordance with the type of transfer object, and the protocol priority determination process of determining their priority is executed (step S1 of FIG. 2).

In the protocol priority determination process, the type (attribute) of object to be transferred is inspected (steps S11 to S14 of FIG. 3). The priorities of usable (matching) transfer protocols are determined from the types of transfer objects (steps S15 to S18 of FIG. 3).

In this example, when the type of transfer object is a file (object) which is processed by a PIM (Personal Information Manager) application such as vCard, the priorities of transfer protocols for the transfer object are determined by using OPP (Object Push Profile) as the highest priority transfer protocol (step S16 of FIG. 3). When the type of transfer object is an image file of JPEG, BitMap, or the like, the priorities of transfer protocols for the transfer object are determined by using BIP (Basic Imaging Profile) as the highest priority transfer protocol (step S17 of FIG. 3). For other general files (including folders), a transfer protocol utilizing FTP (File Transfer Profile) is selected (steps S15 and S18 of FIG. 3).

The protocol matching determination process of selecting transfer protocols commonly usable in the transfer source and transfer destination of the transfer object is executed (step S2 of FIG. 2).

In the protocol matching determination process, transfer protocols supported by the transfer source apparatus are acquired (step S21 of FIG. 4). Also, transfer protocols supported by the object transfer destination apparatus are acquired by negotiation (service search) (step S22 of FIG. 4). The transfer protocols which are acquired in step S21 and supported by the transfer source apparatus, and the transfer protocols which are supported by the transfer destination apparatus are collated with each other to acquire one or a plurality of transfer protocols supported by both the transfer source and transfer destination (step S23 of FIG. 4).

The selection process of selecting a transfer protocol for use (use protocol selection) is executed on the basis of the transfer protocol and its priority, which are determined in the protocol priority determination process (step S1), and the transfer protocols which are determined and acquired in the protocol matching determination process (step S2).

In the use protocol selection process, whether the transfer protocols with the priorities which are selected and determined in the protocol priority determination process (step S1) are included in the transfer protocols which are selected and acquired in the protocol matching determination process (step S2) is determined in accordance with their priorities (steps S31 and S33 of FIG. 5). If a coincident transfer protocol is found in collation (YES in step S31 of FIG. 5), the transfer protocol is selected as the one for use (step S32 of FIG. 5). The selected transfer protocol is transferred to the wireless communication control utility program 201, and a process of transferring the transfer object is executed utilizing the transfer protocol.

FIG. 6 shows an example of the structure of the protocol priority determination table 205. In this example, usable transfer protocols (m types) are described (registered) with their priorities for the attributes of transfer objects (n types) processible by the transfer source apparatus.

FIG. 7 shows an example of the structure of the usable protocol lookup table 206. This example illustrates transfer protocols (j types) which coincide between the transfer source and the transfer destination when the transfer source and transfer destination have one-to-one correspondence.

Figures 8, 9:
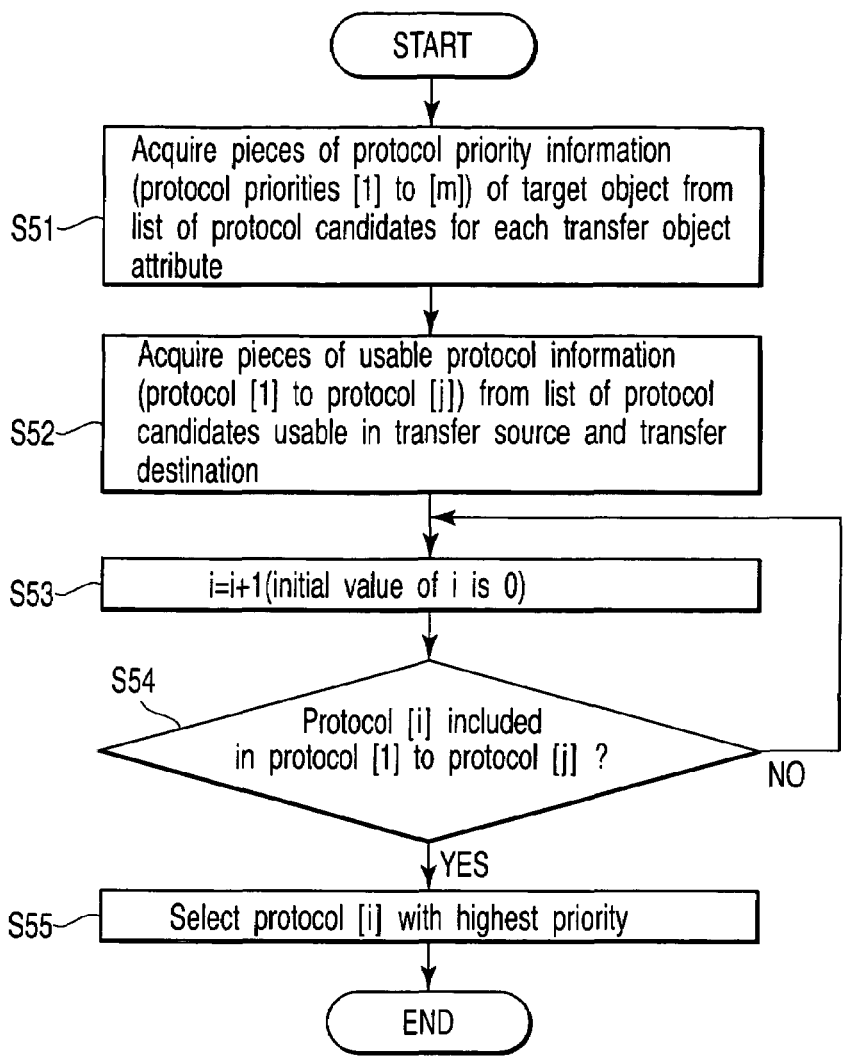
FIG. 8 is a flowchart showing an example of an automatic transfer protocol selection process sequence according to the embodiment of the present invention.
FIG. 9 is a table showing a concrete example of the structure of the protocol priority determination table according to the embodiment of the present invention.

FIG. 8 shows an automatic transfer protocol selection process sequence performed by looking up the protocol priority determination table 205 shown in FIG. 6 and the usable protocol lookup table 206 shown in FIG. 7.

In this case, transfer protocols usable for a transfer object and their priorities are determined by looking up the protocol priority determination table 205 (step S51).

Transfer protocols usable for transferring an object, i.e., transfer protocols supported by the transfer source apparatus and transfer destination apparatus are acquired by looking up the usable protocol lookup table 206 (step S52).

Which of the transfer protocols acquired by looking up the usable protocol lookup table 206 coincides with each transfer protocol acquired by looking up the protocol priority determination table 205 is inspected in the order of priority (steps S53 and S54). Of coincident transfer protocols, one having a highest priority is selected as a transfer protocol for use (step S55).

FIG. 9 shows a concrete example of the structure of the protocol priority determination table 205. In this example, a folder, image file, PIM (Personal Information Manager) file, and general file are exemplified as object attributes, and FTP, BIP, and OPP are exemplified as transfer protocols. In the example shown in FIG. 9, when the transfer object is an image file, BIP is a protocol with a highest priority, OPP is a protocol with a second highest priority, and FTP is a protocol with a third highest priority. For a PIM file, OPP is a protocol with a highest priority, and FTP is a protocol with a second highest priority. For a general file, FTP is a protocol with a highest priority, and OPP is a protocol with a second highest priority. For a folder (set of files), FTP is uniquely set as a transfer protocol.

Figure 10:
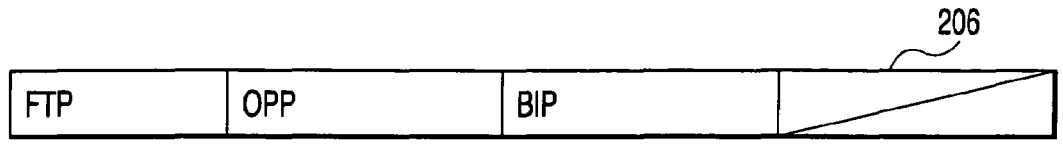
FIG. 10 is a table showing a concrete example of the structure of the usable protocol lookup table according to the embodiment of the present invention.

FIG. 10 shows a concrete example of the structure of the usable protocol lookup table 206. In this example, both the transfer source and transfer destination support three transfer protocols: FTP, OPP, and BIP.

FIG. 11 shows an example of the display of a property window 300 for changing the protocol priority described in the protocol priority determination table 205 shown in FIG. 9. As shown in FIG. 11, the property window 300 comprises menus such as a general 301, mode 302, in-box/card 303, shared folder 304, image box 305, association 306, transfer mode 307, service security 308, service class 309, information 310, and version 311. One of these menus is selectively displayed in an operable manner on the screen of the LCD 13 along with user operation.

For example, when the menu of the transfer mode 307 is selected, the protocol priority determination table 205 shown in FIG. 9 and the usable protocol lookup table 206 shown in FIG. 10 are looked up to display a dialog 312 as shown in FIG. 11. If "file transfer" is selected on the dialog 312 and an apply button 315 is selected, the protocol priority determination table 205 shown in FIG. 9 is looked up to select a preferential transfer protocol. If "card exchange" is selected and the apply button 315 is selected, the protocol priority determination table 205 is looked up because of a general file, and FTP is selected as a transfer protocol which precedes OPP. When no operation is to be performed on the property window 300, a cancel button 314 is selected.

The above embodiment has described the automatic transfer protocol selection process in Bluetooth™ wireless communication. However, the present invention is not limited to this, and the automatic protocol selection process function of the present invention can be applied in various communication environments in which data are transferred between devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transfer apparatus which transfers data from a transfer source device to a transfer destination device via a communication device, the apparatus comprising:

a first determination unit, which determines transfer protocols based on a transfer object to be transferred from the transfer source device to the transfer destination device via the communication device, and determines priorities of the transfer protocols, wherein when the type of transfer object is an object processed by a PIM (Personal Information Manager) application, the priorities of transfer protocols are determined by using OPP (Object Push Profile) as the highest priority transfer protocol, when the type of transfer object is an image file, the priorities of transfer protocols are determined by using BIP (Basic Imaging Profile) as the highest priority transfer protocol, and when the type of transfer object is other general files, the priorities of transfer protocols are determined by using FTP (File Transfer Profile) as the highest priority transfer protocol;

a second determination unit which determines transfer protocols usable in both the transfer source device and the transfer destination device;

a use protocol decision unit which decides a transfer protocol used for transfer on the basis of a determination result of the first determination unit and a determination result of the second determination unit; and a table that makes the transfer protocol and a priority of the transfer protocol correspond to each other for an attribute of each transfer object, wherein the first determination unit determines the transfer protocol and the priority of the transfer protocol by collating the transfer object with the table.

2. The apparatus according to claim 1, wherein the first determination unit determines usable transfer protocols and priorities of the usable transfer protocols from transfer objects transferred by short-distance wireless communication in which the transfer source device and the transfer destination device are wirelessly connected.

3. The apparatus according to claim 1, wherein the second determination unit further comprises a first transfer protocol acquisition unit which acquires transfer protocols supported by the transfer source device and a second transfer protocol acquisition unit which acquires transfer protocols supported by the transfer destination device, collates the transfer protocols acquired by the first transfer protocol acquisition unit and the transfer protocols acquired by the second transfer protocol acquisition unit, and determines coincident transfer protocols as the usable transfer protocols.

4. The apparatus according to claim 3, wherein the use protocol determination unit determines as the transfer protocol for use a transfer protocol having a highest priority among transfer protocols which coincide with the transfer protocols determined by the second determination unit on the basis of the transfer protocols and the priorities of the transfer protocols which are determined by the first determination unit.

5. The apparatus according to claim 2, wherein the second determination unit further comprises a first transfer protocol acquisition unit which acquires transfer protocols supported by the transfer source device and a second transfer protocol acquisition unit which acquires transfer protocols supported by the transfer destination device, collates the transfer protocols acquired by the first transfer protocol acquisition unit and the transfer protocols acquired by the second transfer protocol acquisition unit, and determines coincident transfer protocols as the usable transfer protocols.

6. The apparatus according to claim 2, wherein the use protocol determination unit determines as the transfer protocol for use a transfer protocol having a highest priority among, of the transfer protocols determined by the first determination unit, transfer protocols which coincide with the transfer protocols determined by the second determination unit on the basis of the transfer protocols and the priorities of the transfer protocols which are determined by the first determination unit.

7. A method of transferring a transfer object from a transfer source device to a transfer destination device via a data transfer apparatus employing a communication device, the data transfer apparatus including, a first determination unit, a second determination unit, a use protocol decision unit, and a table, the method comprising:

determining, by the first determination unit, transfer protocols based on the transfer object to be transferred from the transfer source device to the transfer destination device, and priorities of the transfer protocols, wherein when the type of transfer object is an object processed by a PIM (Personal Information Manager) application, the priorities of transfer protocols are determined by using OPP (Object Push Profile) as the highest priority transfer protocol, when the type of transfer object is an image file, the priorities of transfer protocols are determined by using BIP (Basic Imaging Profile) as the highest priority transfer protocol, and when the type of transfer object is other general files, the priorities of transfer protocols are determined by using FTP (File Transfer Profile) as the highest priority transfer protocol;

determining, by the second determination unit, transfer protocols usable in both the transfer source device and the transfer destination device; and determining, by the use protocol decision unit, a transfer protocol used for transfer on the basis of determination results, wherein in determination of the transfer protocols and the priorities of the transfer protocols, the transfer protocols and the priorities of the transfer protocols are determined by collating the transfer object with the table in which the table makes the transfer protocol and a priority of the transfer protocol correspond to each other for an attribute of each transfer object.

8. The method according to claim 7, wherein in determination of the transfer protocols and the priorities of the transfer protocols, usable transfer protocols and priorities of the transfer protocols are determined from transfer objects transferred by short-distance wireless communication in which the transfer source device and the transfer destination device are wirelessly connected.

9. The method according to claim 7, wherein in determination of the usable transfer protocols, transfer protocols supported by the transfer source device are acquired, transfer protocols supported by the transfer destination device are acquired, the transfer protocols supported by the transfer source device and the transfer protocols supported by the transfer destination device are collated, and coincident transfer protocols are determined as the usable transfer protocols.

10. The method according to claim 9, wherein in decision of the transfer protocol, a transfer protocol having a highest priority is decided as the transfer protocol for use among transfer protocols which coincide with the transfer protocols determined as the usable transfer protocols on the basis of the determined transfer protocols and the priorities of the transfer protocols.

11. The method according to claim 9, wherein in determination of the usable transfer protocols, transfer protocols supported by the transfer source device are acquired, transfer protocols supported by the transfer destination device are acquired, the transfer protocols supported by the transfer source device and the transfer protocols supported by the transfer destination device are collated, and coincident transfer protocols are determined as the usable transfer protocols.

12. The method according to claim 9, wherein in decision of the transfer protocol, a transfer protocol having a highest priority is decided as the transfer protocol for use among transfer protocols which coincide with the transfer protocols determined as the usable transfer protocols on the basis of the determined transfer protocols and the priorities of the transfer protocols.

\* \* \* \* \*